United States Patent
Bello et al.

(10) Patent No.: US 7,627,786 B2
(45) Date of Patent: Dec. 1, 2009

(54) TRACKING ERROR EVENTS RELATING TO DATA STORAGE DRIVES AND/OR MEDIA OF AUTOMATED DATA STORAGE LIBRARY SUBSYSTEMS

(75) Inventors: Keith Anthony Bello, Oro Valley, AZ (US); Cheryl Marie Friauf, Tucson, AZ (US); Gregory Tad Kishi, Oro Valley, AZ (US); Duke Andy Lee, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 11/535,238

(22) Filed: Sep. 26, 2006

(65) Prior Publication Data
US 2008/0077825 A1  Mar. 27, 2008

(51) Int. Cl.
*G06F 11/00* (2006.01)
(52) U.S. Cl. ........................................ 714/42
(58) Field of Classification Search ........................ None
See application file for complete search history.

(56) References Cited

U.S. PATENT DOCUMENTS

| | | | | |
|---|---|---|---|---|
| 6,023,709 A | * | 2/2000 | Anglin et al. | 707/204 |
| 7,116,506 B1 | * | 10/2006 | Mojica | 360/71 |
| 2003/0214744 A1 | * | 11/2003 | Ishii et al. | 360/60 |
| 2005/0044451 A1 | * | 2/2005 | Fry et al. | 714/38 |
| 2005/0052772 A1 | * | 3/2005 | Barbian et al. | 360/69 |
| 2007/0050664 A1 | * | 3/2007 | Tan et al. | 714/5 |

* cited by examiner

*Primary Examiner*—Michael C Maskulinski
(74) *Attorney, Agent, or Firm*—John H. Holcombe

(57) ABSTRACT

With detection of a selected error event involving a data storage drive and data storage media, a subsystem attempts to move the media to another drive, and conduct a similar operation. The subsystem separately tracks successive error events of individual drives and individual media, wherein a complete successful operation breaks the chain of the successive error events; and upon the number of successive error events reaching a threshold, fails the data storage drive or the data storage media. Error events are categorized into:

1) error events before or during a mount of a media into a drive; and
2) error events after a successful mount of a media into a drive; and conducts the tracking, comparing and failing steps separately for each of the categories for the drives and the media.

35 Claims, 5 Drawing Sheets

TRACKING ERROR EVENTS RELATING TO DATA STORAGE DRIVES AND/OR MEDIA OF AUTOMATED DATA STORAGE LIBRARY SUBSYSTEMS

FIELD OF THE INVENTION

This invention relates to error handling for data storage, and, more particularly, to tracking error events for data storage drives and data storage media of automated data storage library subsystems.

BACKGROUND OF THE INVENTION

Data storage subsystems comprise highly reliable means for storage and accessing of data. Automated data storage library subsystems provide storage of large numbers of data storage media and typically have numbers of data storage drives, and may provide caches and other intermediate storage to migrate data to, and access data from, the data storage media. When errors may occur, it is desirable to both insure against the loss of data and to insure against unnecessary removal and replacement of either data storage media or data storage drives, and to avoid the time necessary to update the subsystem and/or the data. It is also desirable to insure against unnecessary service calls, and to avoid potential downtime that might result. This means that it is desirable to automatically oversee error events and conduct removals, replacements, and provide service calls when necessary.

SUMMARY OF THE INVENTION

Automated data storage library subsystems, computer program products and methods, in certain embodiments, involve library controls of automated data storage library subsystems, the library having storage shelves configured to store data storage media, a plurality of data storage drives, and at least one robot accessor configured to transfer data storage media between the storage shelves and the data storage drives.

In one embodiment, a method detects the occurrence of selected error events involving a data storage drive and a data storage media; upon a selected error event involving a data storage media, attempts to move the data storage media to another data storage drive, and conduct a similar operation to the operation that resulted in the selected error event; separately tracks successive error events of individual data storage drives and individual data storage media, wherein a complete successful operation of the data storage drive and/or data storage media breaks the chain of the successive error events; compares the number of successive error events of the data storage drive and/or data storage media to a threshold; and upon the number of the successive error events reaching the threshold, places the data storage drive and/or data storage media in a failed category.

In another embodiment, a method additionally involves categorizing the error events involving the data storage drive and error events involving the data storage media into:

1) error events before or during a mount of a data storage media into a data storage drive; and
2) error events after a successful mount of a data storage media into a data storage drive; and conducts the tracking, comparing and placing steps separately for each of the categories for the data storage drives and the data storage media.

In a further embodiment, a method additionally categorizes the error events into:

A) immediate error events; and
B) non-immediate error events;

upon isolating a data storage media or a data storage drive with the immediate error event, places the isolated data storage media, or data storage drive in a failed category; and conducts the tracking, comparing and placing steps for the non-immediate error events for the data storage drive or the data storage media involved in the immediate error event with the failed category data storage media or the failed category data storage drive without considering the immediate error event in the succession or the accumulation of error events.

In a still further embodiment, a method separately accumulates selected error events regarding individual data storage drives and regarding individual data storage media in each of the categories over a period of time; compares the number of the accumulated error events of a data storage drive and of a data storage media in a category to a threshold; and upon the number of the accumulated error events in the category reaching the threshold, placing the data storage drive and/or data storage media in a failed category.

In still another embodiment, a method involves, additionally, if error events are related to each other, reducing weighting of the error events in the succession and in the accumulation of the selected error events.

In a further embodiment, a method involves additionally, if a data storage drive is removed from the subsystem, clearing the error events of data storage media that occurred at the removed data storage drive.

In still another embodiment, a method involves, if a data storage drive is removed from the subsystem and returned, clearing the error events of the removed and returned data storage drive.

In a still further embodiment, a method involves, if a data storage media is removed from the subsystem, clearing the error events of data storage drive that occurred at the data storage drive with respect to the removed data storage media.

In a still further embodiment, a method involves, additionally, if a data storage media is removed from the subsystem and returned, clearing the error events of the removed and returned data storage media.

In another embodiment, a method involves reducing related errors to a single selected error event.

In a further embodiment, the a method involves storing, in a database, information relating to selected error events relevant to both a data storage media and a data storage drive, the information describing the data storage media and the data storage drive and the selected error event.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
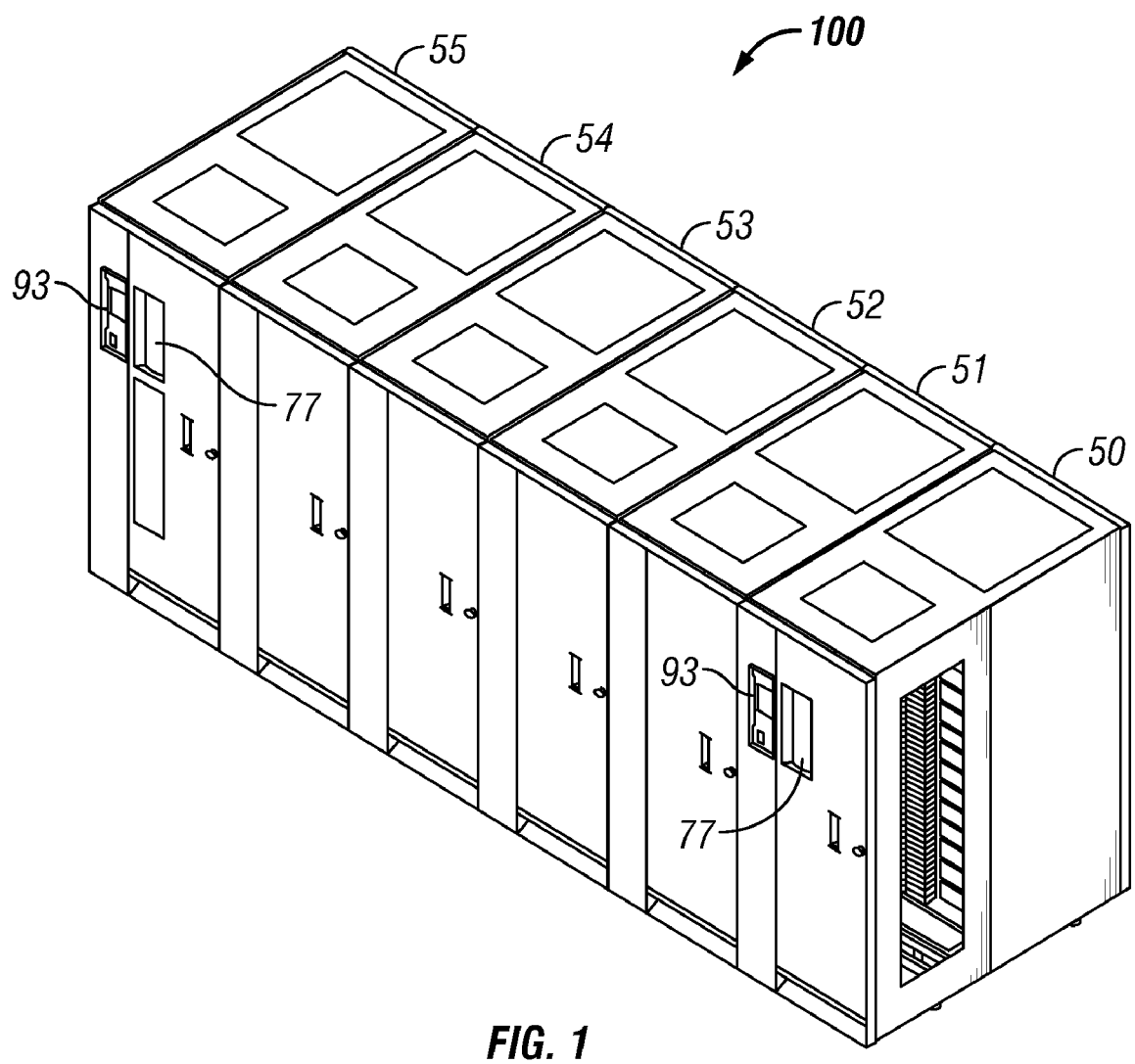
FIG. 1 is an isometric illustration of an automated data storage library which may implement the present invention.
Figure 2:
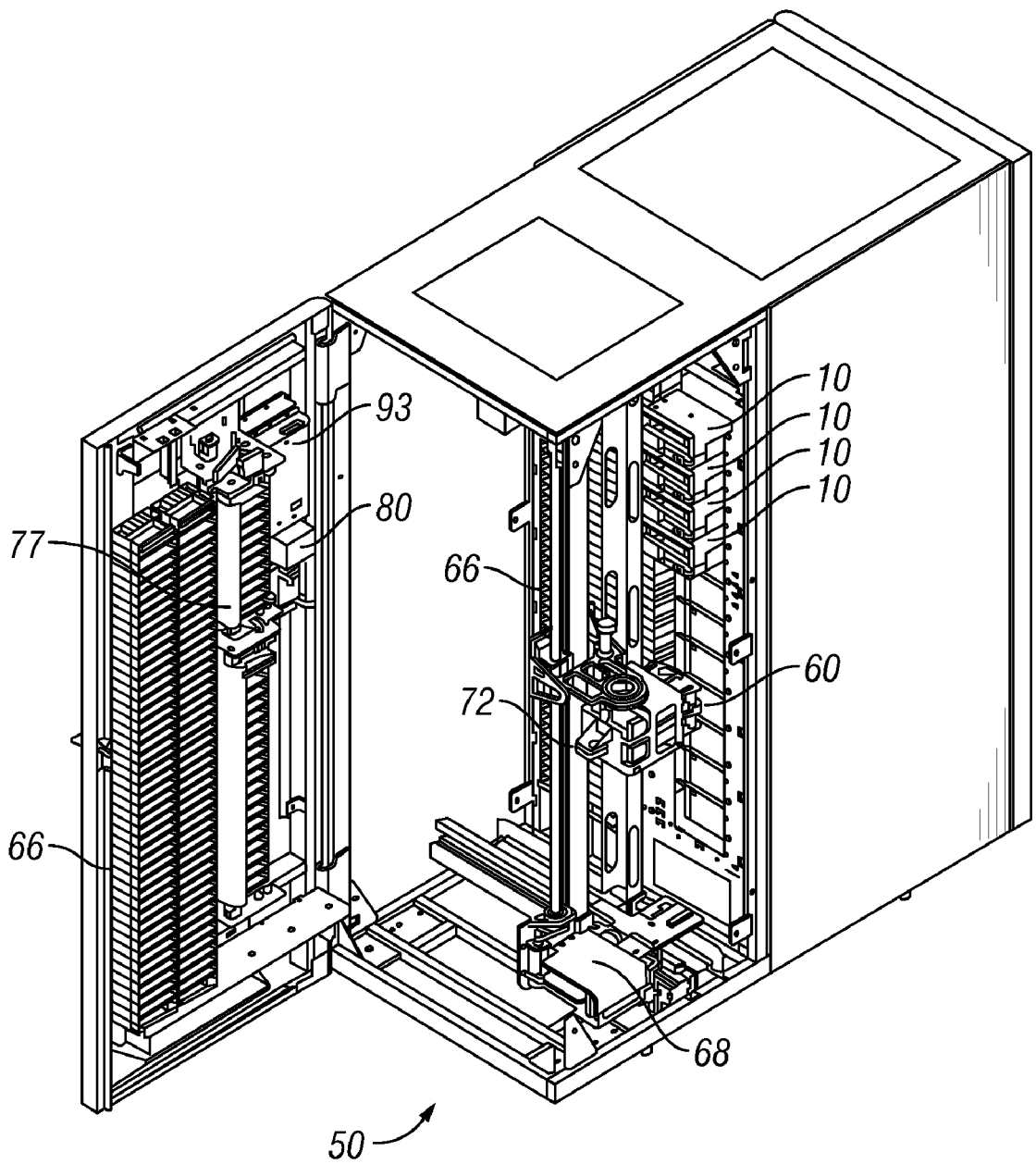
FIG. 2 is a diagrammatic illustration of an opened frame of the automated data storage library of FIG. 1
Figure 3:
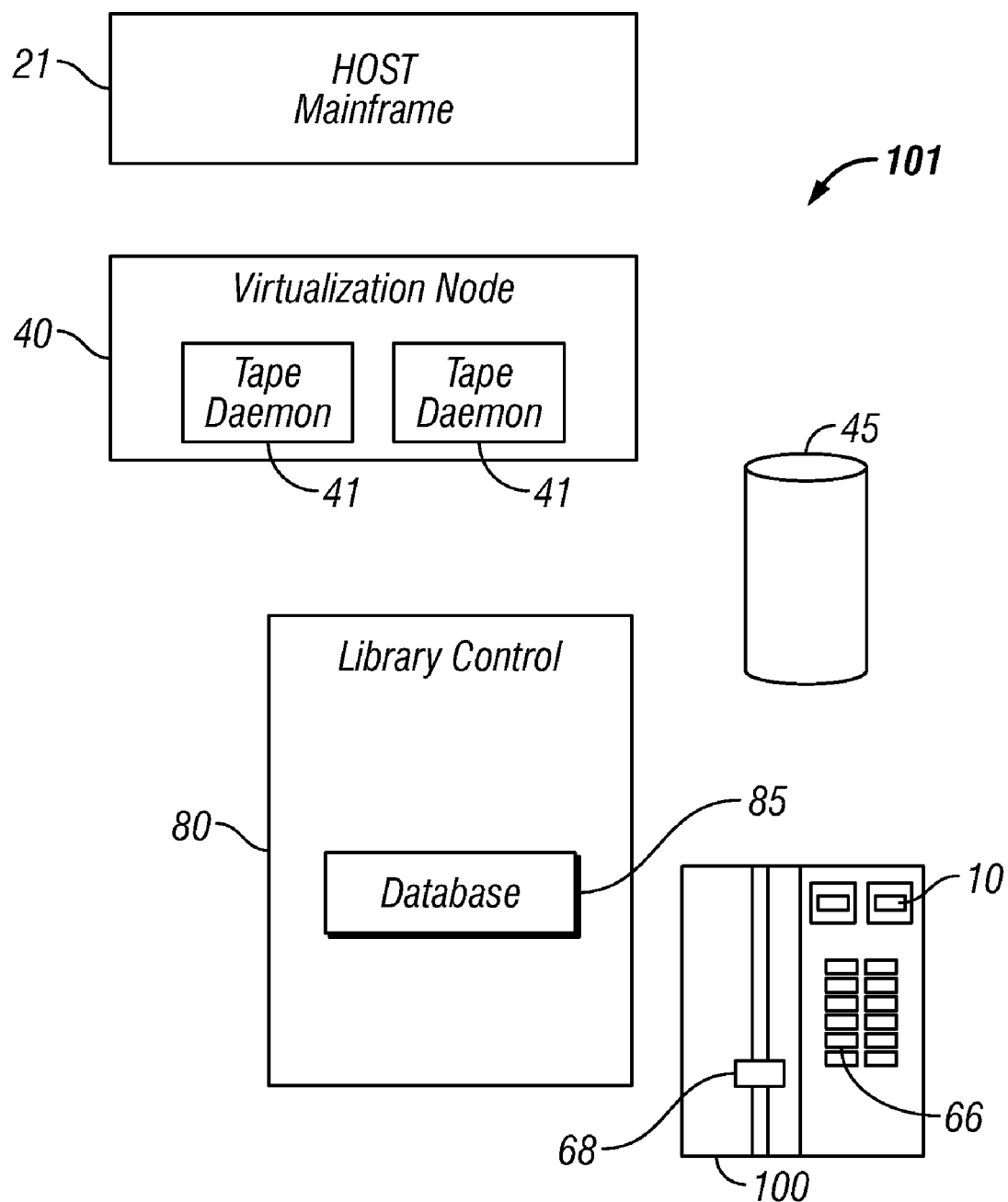
FIG. 3 is a block diagrammatic illustration of a system incorporating an automated data storage library subsystem with the automated data storage library of FIGS. 1 and 2.

FIGS. 1, 2 and 3 illustrate an embodiment of an automated data storage library 100, configured in a subsystem 101 in accordance with the present invention, which is arranged to access data storage media, such as magnetic tape cartridges, typically in response to commands from at least one external host system 21, and comprises one or more frames 50, 51, 52, 53, 54, and 55, each of which has a plurality of storage shelves 66 for storing the data storage media, and may have a plurality of data storage drives 10 for reading and for writing data with respect to the data storage media. The library 100 further comprises at least one robot accessor 68 for transporting the data storage media between the storage shelves 66 and the data storage drives 10. The robot accessor 68 comprises a gripper assembly 60 for gripping one or more of the data storage media, and may comprise an accessor sensor 72 to read the labels of the data storage media. Magnetic tape data storage cartridges may be added to or removed from the library, for example, at input/output stations 77. Herein, an automated data storage library subsystem 101 may comprise a single automated data storage library 100, or a plurality of libraries. A plurality of libraries may be physically coupled together, such that a robot accessor may move between and into each library, or such that a pass through is established to allow the movement of data storage media between the libraries.

The library subsystem 101 also comprises a library control 80, which may be distributed among the frames to operate the library, communicate with a host system 21, and communicate with the data storage drives 10 and 11. Further, the library may provide one or more operator panels 93 for communicating with the library control. An example of an automated data storage library comprises the IBM® 3584 tape library, and another example of an automated data storage library comprises the IBM® 3494 tape library. Herein "library control" may comprise any suitable logic, microprocessor, and associated memory and/or data storage for responding to program code, and the associated memory and/or data storage may comprise fixed or rewritable memory or data storage devices. The program code may be supplied to the library control directly as from a data storage device or memory, for example by an input from an optical disk, for example at operator panel 93, or by being read from a magnetic tape cartridge, for example at a data storage drive 10, or from a network, for example via host system 21, or by any other suitable means. The library control 80 is typically located in the automated data storage library 100, but may be physically located at any point in the subsystem, or spread across the library or the subsystem.

The library subsystem 101 may or may not comprise a virtualization node 40, and may or may not comprise a cache 45. A virtualization node 40 may comprise part of the library control or may comprise a separate entity, and comprises tape daemons 41 that emulate a tape drive to the host system 21, but actually operate on a file that is on cache 45 as is known to those of skill in the art. A cache 45 is typically a disk file subsystem such as a RAID) (Redundant Array of Independent Disks), or a number of such disk file subsystems, as is known to those of skill in the art. The subsystem places data in cache from the host system and migrates that data to the automated data storage library. Data may be retained in the cache 45 for quick access by the host system, and, if the data has been migrated, it is typically moved from the automated data storage library to cache and made available from the cache, as is known to those of skill in the art.

Although libraries, data storage drives and data storage media are highly reliable, errors may occur, and the types of errors may be highly varied. To avoid some errors, various retry procedures may be conducted. For example, a read error may be the result of a misalignment of the read heads of a magnetic tape drive that is reading the data from a magnetic tape data storage media, a misalignment of the write heads of the magnetic tape drive that wrote the data, a defect in the magnetic tape data storage media, a stretched magnetic tape data storage media, a servo error in the magnetic tape drive that is reading the data, etc. Thus, retry procedures may attempt to vary one or more of the parameters of the magnetic tape drive, such as offsetting the servo a small amount, etc. Herein, not every error results in a "selected error event". For example, if the drive conducts retry procedures that ultimately work, the original error may not comprise a selected error event. Alternatively, if a large number of retry procedures are conducted before the operation is successfully completed, the original error may be considered a warning of future problems, and, so, the original (or the last) error may be considered a selected error event. Still alternatively, the error may be of a type that no retry will work, such as that a data storage media cartridge is missing from a storage shelf, for example, it was removed from the library by an operator who did not update the library inventory, and therefore an error in being unable to find a label, or being unable to access a cartridge at the physical storage shelf indicated by the physical inventory, may constitute a selected error event without significant retry procedures. In the same situation, if the error is being unable to read the label (because it isn't there), a substantial number of retries may be conducted to make sure there is an error before the error becomes a selected error event. Many other scenarios are known to those of skill in the art, and the selection of which types of errors and the amount of retries that are required before a potential error becomes a selected error event is subject to considerable variation herein.

Further, many errors may occur where it is unknown whether the error is the result of the data storage drive, the data storage media, a previous data storage drive, or another entity or device. The selected error event can only provide an error code describing the detected error or problem, and does not necessarily identify the source of the error or problem.

Figure 4:
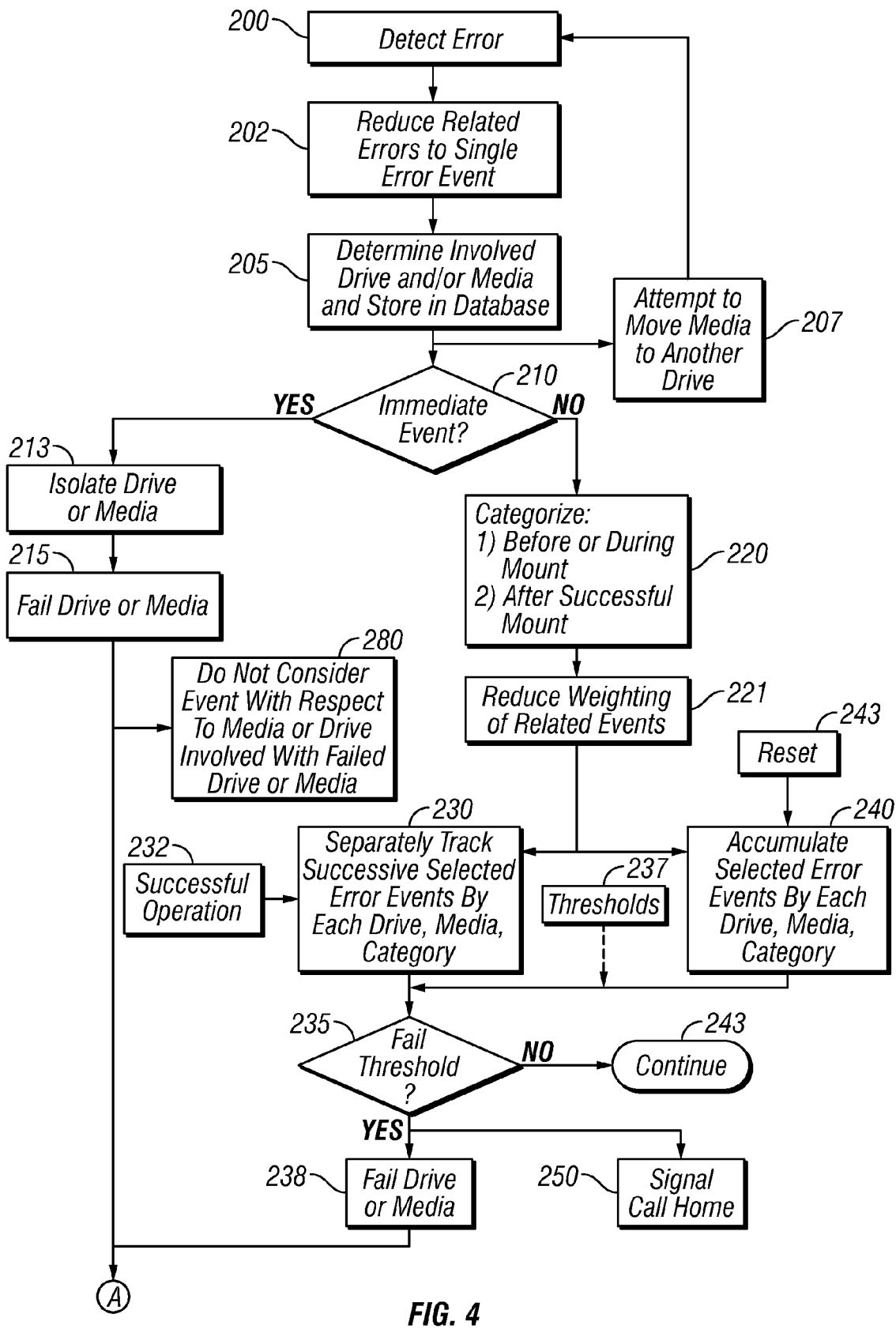
FIG. 4 is a flow chart depicting the operation of the automated of the automated data storage library subsystem of FIG. 3 in accordance with the present invention.
Figure 4:
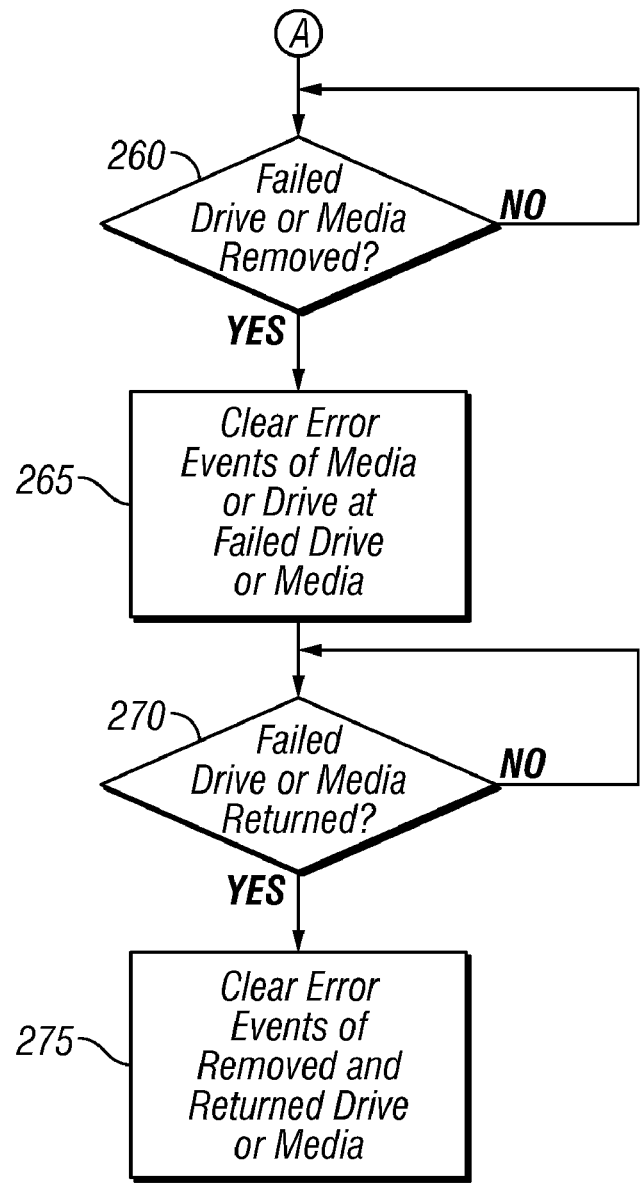

Referring to FIGS. 3 and 4, an embodiment of a method for implementing the invention with respect to an automated data storage library subsystem is illustrated. In step 200, a selected error event, as discussed above, is detected. The detection may be by a data storage drive 10, by the robot accessor 68, etc., and is typically reported by means of an error code. Herein, the detection also describes the involved data storage drive and/or data storage media.

Step 202 groups some of the selected error events that may be related to one another, reducing the detected error events to a single error event. For example, the data storage drive may have an error in opening a file of a data storage media that has been mounted in the drive, may have an error in reading data from the data storage media, may have an error in writing data to the data storage media, and may have an error in closing a file. All of these errors may have a single cause, and are reduced to a single error event.

In step 205, the detection information may be provided to, and stored in database 85 of the library control 80, for example in a drive-media table, listing each selected error event by the involved data storage drive and the involved data storage media. If the information relating to a selected error event is relevant to both a data storage media and a data storage drive, the information stored in the database describes the data storage media and the error event, and describes the data storage drive and the selected error event. The table allows for tracking of the selected error events as will be described. All of the media in the library may have entries in the database 85 for purposes unrelated to errors. Examples of information stored in the database comprise volume name, status and amount of data it contains. Step 205 determines the involved data storage drive, if any, and the involved data storage media, if any, and stores that information in the database 85. Database 85 may comprise a portion of the memory and/or data storage of the library control, or may comprise separate memory and/or separate data storage.

With respect to the present invention, the database 85 additionally identifies at least the last physical drive this media was mounted on that had an immediately preceding error. In step 207, based on the database information of the last physical drive where there was an error, the library attempts to move the data storage media involved in the error to another data storage drive, and conduct a similar operation to the operation that resulted in the selected error event. If the error is repeated, for example, by a repeat of the error detection step 200, etc., on the second data storage drive, then the media is most likely the cause of the problem. If the error is not repeated, then it is unknown whether the error was overcome by the other drive, or whether the original drive was the cause of the problem. Step 207 prevents a retry procedure of trying the operation again, but finding that the only drive currently available is the drive where the problem occurred, and trying the operation at the original drive and repeating the problem, possibly over and over.

In step 210, some selected error events may be considered "immediate events". One example comprises a library subsystem attempting to access a data storage media cartridge and cannot locate the cartridge, meaning that it is inaccessible or misplaced, for example, it has been removed from the library subsystem without updating the inventory. Another example comprises a drive that has been reconfigured but the reconfiguration has not been noted to the library control, and hence the drive previous to the reconfiguration no longer "exists" in the library. Step 210 categorizes the error events into A) immediate error events; and B) non-immediate error events.

If the error event is an immediate error event, step 213 isolates a data storage media or a data storage drive as having the immediate error event, and, in step 215, places the isolated data storage media or data storage drive in a failed category. For example, if a data storage media cartridge cannot be accessed, the media is failed. If a data storage drive cannot be found, the drive is failed. Information about the failed media or about the failed drive may be maintained in the database in case the media or the drive reappears.

If the error event is a non-immediate error event, step 220 categorizes the error events involving the data storage drive and/or data storage media into 1) error events before or during a mount of a data storage media into a data storage drive; and 2) error events after a successful mount of a data storage media into a data storage drive.

In the case of data storage media, rather than characterize the media as failed after an error event, the media, at least after certain errors, may be sent to a recovery queue. Data storage media in the recovery queue may then go through a read only recovery process to recover as much data as possible. Herein, the term "failed category" and similar terminology refer both or either to a characterization of failure and to placement in a recovery process.

An example of an error event before or during a mount of a data storage media comprises a tape leader block that cannot be threaded into the drive, for example because the leader block is missing or at an erroneous position, or because the drive threading mechanism is not working properly. An example of an error event after a successful mount is an inability to write data to the media, for example because the write protect button has been set, or because the drive write driver is not functioning properly. Another example of an error event after a successful mount is a servo error, for example, because the tape is stretched and mispositioning the servo tracks, or because the drive servo has a tracking error. If an error occurs that may be either a drive or the media, an error event is attributed to both.

In accordance with the present invention, the categorized error events are so different in character that they are unrelated, and tracking successive errors of these different types would likely lead to an erroneous failing of a drive or media.

Providing only two categories puts the emphasis on the specific drive or the specific media, and not on the type of error, changing the emphasis from how the particular drive encodes the error. In this manner, the algorithm is agnostic to the drive type or the drive manufacturer, who may have specific ways of encoding errors that specifically interest them.

Step 221 reduces the weighting of related error events. For example, if a library is powered off, errors may occur at some or all of the data storage drives when the library is again powered on and/or reinitialized, and step 221 reduces the weighting, or eliminates, all of the errors that appear related to the power on and/or reinitialization.

Step 230 separately tracks successive error events of the individual data storage drives and of the individual data storage media, and in the two categories of step 220. If a data storage drive or a data storage media has no error event attributed to its involvement, the data storage drive or data storage media need not be tracked at all. The successive error events are, for example, tracked from the entries in the database discussed above. Herein, "separately tracking" can refer to tracking separately each of all of the drives and media and noting whether they have error events, or tracking separately only the drives and media that have been identified with an error event. As discussed above, if an error occurs that may be either a drive or the media, an error event is attributed to both. It is presumed that successive errors, because of step 207 moving the media to another drive, arise because the drive or the media having the successive error events is the problem.

In step 232, a complete successful operation of the data storage drive and/or data storage media breaks the chain of the successive error events. In accordance with the present invention, the chain only relates to the specific category of the error event. Thus, a successful mount of a cartridge breaks a chain of error events before or during a mount relating to the cartridge being mounted and/or to the drive at which the cartridge is being mounted, but does not break a chain of error events occurring after successful mounts. Successful operation after a mount will break a chain of error events of the category "after a successful mount".

Herein, the terminology "data storage drive and/or data storage media", the reverse, and similar terminology, refer to an action pertinent to at least one of a data storage drive and a data storage media. Thus, in the example of a chain of successive error events involving a data storage cartridge after a successful mount, where the data storage drive has no current chain of error events, successful operation of the drive and cartridge only breaks the chain of successive error events of the cartridge.

Step 235 compares the number of successive error events of the data storage drive and/or of the data storage media to a threshold 237; and upon the number of the successive error events reaching the threshold, in step 238, places the data storage drive and/or data storage media in a failed category.

The thresholds of step 237 may be set differently for data storage media and for data storage drives, and may be set differently for the different categories of error events. A threshold for drives may be set conservatively, for example, to fail drives easily to prevent the situation worsening and potentially ruining a number of media, or perhaps to compensate for drives that are not as precise as others. A threshold may be set higher, for example, to avoid or postpone taking a long time to swap drives during an unusually high load cycle. A threshold for media may be set conservatively to better insure against the potential loss of data, or may be set high for media that has data that is not critical, such as a string of seismic data.

The occurrence of a string of successive error events is strong evidence that the drive or media that has the successive errors is a problem. An example of a threshold is therefore 4 successive error events.

Step 240 separately accumulates selected error events regarding individual data storage drives and regarding individual data storage media in each of the categories over a period of time. The time, such as a 24 hour period, may be controlled by a reset 243. This accumulation is not reset by a successful operation, and the accumulation continues for the entire period. For example, after an error event with a media, such that the media, in step 207, is mounted on a different drive, a different operation is completed successfully with a different media, breaking the chain of step 232, but an error event reoccurs later in the day. This could also be an indication of a problem with the drive.

Step 235 compares the number of the accumulated error events of a data storage drive and/or of a data storage media in a category to a threshold 237; and upon the number of the accumulated error events in the category reaching the threshold, placing the data storage drive and/or data storage media in a failed category in step 238.

The thresholds of step 237 may be set differently for accumulated error events of step 240 than for the successive events of step 230. Further, the thresholds may be different for data storage media and for data storage drives, and may be set differently for the different categories of error events. As discussed above, a threshold for drives may be set conservatively, for example, to fail drives easily to prevent the situation worsening and potentially ruining a number of media, or perhaps to compensate for drives that are not as precise as others. A threshold may be set higher, for example, to avoid or postpone taking a long time to swap drives during an unusually high load cycle. A threshold for media may be set conservatively to better insure against the potential loss of data, or may be set high for media that has data that is not critical, such as a string of seismic data.

The occurrence of a number of error events in a given time period is evidence that the drive or media that has the errors is a problem. An example of a threshold is therefore an accumulated 4 error events.

If neither threshold is met, the process continues from step 243 to examine the database to track and accumulate error event counts.

An alternate type of failure is pointed out in step 250, where not only is a drive or media failed, but enough drives and/or media have failed to present a situation that requires additional attention. Thus, in step 250, a "call home" signal is initiated to call an administrator, and/or the manufacturer of the library, and/or the manufacturer or supplier of the drives, and/or the manufacturer or supplier of the media. The subsequent analysis may or may not result in a service call.

Once a failed drive or media is removed, detected by step 260, it may be that the error events of the media or drives involved with the drive or media, which error events also had been added to the database for affected other media or drives, are now solved.

In steps 260 and 265, if a data storage drive is removed from the subsystem, the error events of data storage media that occurred at the removed data storage drive are cleared.

Similarly, in steps 260 and 265, if a data storage media is removed from the subsystem, the error events of data storage drive that occurred at the data storage drive with respect to the removed data storage media are cleared.

Once a failed drive or media has been removed and then returned, detected by step 270, it may be assumed that the drive or media was repaired before being returned.

In steps 270 and 275, if a data storage drive is removed from the subsystem and returned, the error events of the removed and returned data storage drive are cleared.

Also in steps 270 and 275, if a data storage media is removed from the subsystem and returned, the error events of the removed and returned data storage media are cleared.

In the case of an immediate error event, in step 280, if a data storage drive is failed in steps 210, 213 and 215, the corresponding error(s) of data storage media that occurred at the failed data storage drive are not considered as error events. Similarly, if a data storage media is failed in steps 210, 213 and 215, the corresponding error(s) of data storage drives that occurred with respect to the failed data storage media are not considered as error events.

Those of skill in the art will understand that changes may be made with respect to the methods discussed above, including changes to the ordering of the steps, or the removal of various steps. Further, those of skill in the art will understand that differing specific component arrangements may he employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In an automated data storage library subsystem with storage shelves configured to store data storage media, a plurality of data storage drives, and at least one robot accessor configured to transfer data storage media between said storage shelves and said data storage drives, the method comprising:

detecting the occurrence of selected error events involving a data storage drive and selected error events involving a data storage media;

upon a selected error event involving a data storage media, attempting to move said data storage media to another data storage drive to prevent a retry procedure, and conducting a similar operation to the operation that resulted in said selected error event;

separately tracking successive error events of individual data storage drives and individual data storage media, wherein a complete successful operation of at least one of said data storage drives and said data storage media breaks the chain of said successive error events for said successful at least one data storage drive and said data storage media having a chain of said successive error events;

comparing the number of said successive error events of at least one of said data storage drive and said data storage media to a threshold; and upon said number of said successive error events reaching said threshold, placing at least one of said data storage drive and said data storage media in a failed category.

2. The method of claim 1, additionally:

categorizing said error events involving said data storage drive and said error events involving said data storage media into:

1) error events before and during a mount of a data storage media into a data storage drive; and 2) error events after a successful mount of a data storage media into a data storage drive;

conducting said tracking, comparing and placing steps for each of said categories for said data storage drives and said data storage media; and wherein said breaking of said chain of successive error events applies only to a category of error events to which said complete successful operation belongs.

3. The method of claim 2, additionally:

separately accumulating selected error events regarding individual data storage drives and regarding individual data storage media in each of said categories over a period of time;

comparing the number of said accumulated error events of at least one of a data storage drive and a data storage media in a category to a threshold; and upon said number of said accumulated error events in said category reaching said threshold, placing said at lest one of said data storage drive and said data storage media in a failed category.

4. The method of claim 1, additionally:

reducing related errors to a single said selected error event.

5. The method of claim 1, additionally:

storing, in a database, information relating to said selected error events relevant to both a data storage media and a data storage drive, said information describing said data storage media and said data storage drive and said selected error event.

6. In an automated data storage library subsystem with storage shelves configured to store data storage media, a plurality of data storage drives, and at least one robot accessor configured to transfer data storage media between said storage shelves and said data storage drives, the method comprising:

detecting the occurrence of selected error events involving a data storage drive and selected error events involving a data storage media;

upon a selected error event involving a data storage media, attempting to move said data storage media to another data storage drive, and conducting a similar operation to the operation that resulted in said selected error event;

separately tracking successive error events of individual data storage drives and individual data storage media, wherein a complete successful operation of at least one of said data storage drive and said data storage media breaks the chain of said successive error events;

comparing the number of said successive error events of at least one of said data storage drive and said data storage media to a threshold;

upon said number of said successive error events reaching said threshold, placing at least one of said data storage drive and said data storage media in a failed category;

additionally:

categorizing said error events involving said data storage drive and said error events involving said data storage media into:

1) error events before and during a mount of a data storage media into a data storage drive; and 2) error events after a successful mount of a data storage media into a data storage drive; and conducting said tracking, comparing and placing steps for each of said categories for said data storage drives and said data storage media; and, additionally:

categorizing said error events into:

A) immediate error events; and

B) non-immediate error events; and upon isolating at least one of a data storage media and a data storage drive with said immediate error event, placing said isolated at least one of said data storage media and said data storage drive in a failed category; and conducting said tracking, comparing and placing steps for said non-immediate error events for said at least one of said data storage drive and said data storage media involved in said immediate error event with at least one of said failed category data storage media and said failed category data storage drive without considering said immediate error event in said succession or said accumulation of error events.

7. In an automated data storage library subsystem with storage shelves configured to store data storage media, a plurality of data storage drives, and at least one robot accessor configured to transfer data storage media between said storage shelves and said data storage drives, the method comprising:

detecting the occurrence of selected error events involving a data storage drive and selected error events involving a data storage media;

upon a selected error event involving a data storage media, attempting to move said data storage media to another data storage drive, and conducting a similar operation to the operation that resulted in said selected error event;

separately tracking successive error events of individual data storage drives and individual data storage media, wherein a complete successful operation of at least one of said data storage drive and said data storage media breaks the chain of said successive error events;

comparing the number of said successive error events of at least one of said data storage drive and said data storage media to a threshold;

upon said number of said successive error events reaching said threshold, placing at least one of said data storage drive and said data storage media in a failed category;

additionally:

categorizing said error events involving said data storage drive and said error events involving said data storage media into:

1) error events before and during a mount of a data storage media into a data storage drive; and 2) error events after a successful mount of a data storage media into a data storage drive; and conducting said tracking, comparing and placing steps for each of said categories for said data storage drives and said data storage media;

additionally:
separately accumulating selected error events regarding individual data storage drives and regarding individual data storage media in each of said categories over a period of time;
comparing the number of said accumulated error events of at least one of a data storage drive and a data storage media in a category to a threshold; and
upon said number of said accumulated error events in said category reaching said threshold, placing said at lest one of said data storage drive and said data storage media in a failed category; and, additionally: if error events are related to each other, reduce weighting of said error events in said succession and in said accumulation of said selected error events.

8. In an automated data storage library subsystem with storage shelves configured to store data storage media, a plurality of data storage drives, and at least one robot accessor configured to transfer data storage media between said storage shelves and said data storage drives, the method comprising:
detecting the occurrence of selected error events involving a data storage drive and selected error events involving a data storage media;
upon a selected error event involving a data storage media, attempting to move said data storage media to another data storage drive, and conducting a similar operation to the operation that resulted in said selected error event;
separately tracking successive error events of individual data storage drives and individual data storage media, wherein a complete successful operation of at least one of said data storage drive and said data storage media breaks the chain of said successive error events;
comparing the number of said successive error events of at least one of said data storage drive and said data storage media to a threshold; and
upon said number of said successive error events reaching said threshold, placing at least one of said data storage drive and said data storage media in a failed category; and, additionally:
if a data storage drive is removed from said subsystem, clearing said error events of data storage media that occurred at said removed data storage drive.

9. The method of claim 8, additionally:
if a data storage drive is removed from said subsystem and returned, clearing said error events of said removed and returned data storage drive.

10. In an automated data storage library subsystem with storage shelves configured to store data storage media, a plurality of data storage drives, and at least one robot accessor configured to transfer data storage media between said storage shelves and said data storage drives, the method comprising:
detecting the occurrence of selected error events involving a data storage drive and selected error events involving a data storage media;
upon a selected error event involving a data storage media, attempting to move said data storage media to another data storage drive, and conducting a similar operation to the operation that resulted in said selected error event;
separately tracking successive error events of individual data storage drives and individual data storage media, wherein a complete successful operation of at least one of said data storage drive and said data storage media breaks the chain of said successive error events;
comparing the number of said successive error events of at least one of said data storage drive and said data storage media to a threshold; and
upon said number of said successive error events reaching said threshold, placing at least one of said data storage drive and said data storage media in a failed category; and, additionally:
if a data storage media is removed from said subsystem, clearing said error events of data storage drive that occurred at said data storage drive with respect to said removed data storage media.

11. The method of claim 10, additionally:
if a data storage media is removed from said subsystem and returned, clearing said error events of said removed and returned data storage media.

12. An automated data storage library subsystem comprising:
storage shelves configured to store data storage media;
a plurality of data storage drives configured to mount, demount, read and write data with respect to data storage media;
at least one robot accessor configured to transfer data storage media between said storage shelves and said data storage drives; and
library control configured to:
detect the occurrence of selected error events involving data storage drives;
categorize said error events into:
1) error events before and during a mount of a data storage media into a data storage drive; and
2) error events after a successful mount of a data storage media into a data storage drive;
separately track successive error events of individual data storage drives in each of said categories, wherein a complete successful operation of said data storage drive breaks the chain of said successive error events, wherein said breaking of said chain of successive error events applies only to a category of error events to which said complete successful operation belongs;
compare the number of said successive error events of a data storage drive in a category to a threshold; and
upon said number of said successive error events reaching said threshold, place said data storage drive in a failed category.

13. The automated data storage library subsystem of claim 12, wherein said library control is additionally configured to:
detect the occurrence of selected error events involving data storage media;
categorize said error events involving said data storage media into:
1) error events before and during a mount of a data storage media into a data storage drive; and
2) error events after a successful mount of a data storage media into a data storage drive;
separately track successive error events of individual data storage media in each of said categories, wherein a complete successful operation of said data storage media with respect to a data storage drive breaks the chain of said successive error events; wherein said breaking of said chain of successive error events applies only to a category of error events to which said complete successful operation belongs;
compare the number of said successive error events of a data storage media in a category to a threshold; and
upon said number of said successive error events reaching said threshold, place said data storage media in a failed category.

14. The automated data storage library subsystem of claim 13, wherein said library control is additionally configured to: reduce related errors to a single said selected error event.

15. The automated data storage library subsystem of claim 13, wherein said library control is additionally configured to: store, in a database, information relating to said selected error events relevant to both a data storage media and a data storage drive, said information describing said data storage media and said data storage drive and said selected error event.

16. An automated data storage library subsystem comprising:
  storage shelves configured to store data storage media;
  a plurality of data storage drives configured to mount, demount, read and write data with respect to data storage media;
  at least one robot accessor configured to transfer data storage media between said storage shelves and said data storage drives; and
  library control configured to:
  detect the occurrence of selected error events involving data storage drives;
  categorize said error events into:
  1) error events before and during a mount of a data storage media into a data storage drive; and
  2) error events after a successful mount of a data storage media into a data storage drive;
  separately track successive error events of individual data storage drives in each of said categories, wherein a complete successful operation of said data storage drive breaks the chain of said successive error events;
  compare the number of said successive error events of a data storage drive in a category to a threshold; and
  upon said number of said successive error events reaching said threshold, place said data storage drive in a failed category; and
  wherein said library control is additionally configured to:
  detect the occurrence of selected error events involving data storage media;
  categorize said error events involving said data storage media into:
  1) error events before and during a mount of a data storage media into a data storage drive; and
  2) error events after a successful mount of a data storage media into a data storage drive;
  separately track successive error events of individual data storage media in each of said categories, wherein a complete successful operation of said data storage media with respect to a data storage drive breaks the chain of said successive error events;
  compare the number of said successive error events of a data storage media in a category to a threshold; and
  upon said number of said successive error events reaching said threshold, place said data storage media in a failed category; and, wherein said library control is additionally configured to:
  categorize said error events into:
  A) immediate error events; and
  B) non-immediate error events; and
  upon isolating at least one of a data storage media and a data storage drive with said immediate error event, place said isolated at least one of said data storage media and said data storage drive in a failed category; and conduct said tracking, comparing and placing steps for said non-immediate error events for said at least one of said data storage drive and said data storage media involved in said immediate error event with at least one of said failed category data storage media and said failed category data storage drive without considering said immediate error event in said succession of error events.

17. An automated data storage library subsystem comprising:
  storage shelves configured to store data storage media;
  a plurality of data storage drives configured to mount, demount, read and write data with respect to data storage media;
  at least one robot accessor configured to transfer data storage media between said storage shelves and said data storage drives; and
  library control configured to:
  detect the occurrence of selected error events involving data storage drives;
  categorize said error events into:
  1) error events before and during a mount of a data storage media into a data storage drive; and
  2) error events after a successful mount of a data storage media into a data storage drive;
  separately track successive error events of individual data storage drives in each of said categories, wherein a complete successful operation of said data storage drive breaks the chain of said successive error events;
  compare the number of said successive error events of a data storage drive in a category to a threshold; and
  upon said number of said successive error events reaching said threshold, place said data storage drive in a failed category; and
  wherein said library control is additionally configured to:
  detect the occurrence of selected error events involving data storage media;
  categorize said error events involving said data storage media into:
  1) error events before and during a mount of a data storage media into a data storage drive; and
  2) error events after a successful mount of a data storage media into a data storage drive;
  separately track successive error events of individual data storage media in each of said categories, wherein a complete successful operation of said data storage media with respect to a data storage drive breaks the chain of said successive error events:
  compare the number of said successive error events of a data storage media in a category to a threshold; and
  upon said number of said successive error events reaching said threshold, place said data storage media in a failed category; and, wherein said library control is additionally configured to:
  separately accumulate selected error events in said categories regarding individual data storage drives and regarding individual data storage media over a period of time;
  compare the number of said accumulated error events of at least one of a data storage drive and a data storage media to a threshold; and
  upon said number of said accumulated error events reaching said threshold, place said at least one of said data storage drive and said data storage media in a failed category.

18. The automated data storage library subsystem of claim 17, wherein said library control is additionally configured to:
  if error events are related to each other, reduce weighting of said error events in said succession and in said accumulation of said selected error events.

19. An automated data storage library subsystem comprising:
- storage shelves configured to store data storage media;
- a plurality of data storage drives configured to mount, demount, read and write data with respect to data storage media;
- at least one robot accessor configured to transfer data storage media between said storage shelves and said data storage drives; and
- library control configured to:
- detect the occurrence of selected error events involving data storage drives;
- categorize said error events into:
  1) error events before and during a mount of a data storage media into a data storage drive; and
  2) error events after a successful mount of a data storage media into a data storage drive;
- separately track successive error events of individual data storage drives in each of said categories, wherein a complete successful operation of said data storage drive breaks the chain of said successive error events;
- compare the number of said successive error events of a data storage drive in a category to a threshold; and
- upon said number of said successive error events reaching said threshold, place said data storage drive in a failed category; and
- wherein said library control is additionally configured to:
- detect the occurrence of selected error events involving data storage media;
- categorize said error events involving said data storage media into:
  1) error events before and during a mount of a data storage media into a data storage drive; and
  2) error events after a successful mount of a data storage media into a data storage drive;
- separately track successive error events of individual data storage media in each of said categories, wherein a complete successful operation of said data storage media with respect to a data storage drive breaks the chain of said successive error events;
- compare the number of said successive error events of a data storage media in a category to a threshold; and
- upon said number of said successive error events reaching said threshold, place said data storage media in a failed category; and, wherein said library control is additionally configured to:
- if a data storage drive is removed from said subsystem, clear said error events of data storage media that occurred at said removed data storage drive.

20. The automated data storage library subsystem of claim 19, wherein said library control is additionally configured to:
- if a data storage drive is removed from said subsystem and returned, clear said error events of said removed and returned data storage drive.

21. An automated data storage library subsystem comprising:
- storage shelves configured to store data storage media;
- a plurality of data storage drives configured to mount, demount, read and write data with respect to data storage media;
- at least one robot accessor configured to transfer data storage media between said storage shelves and said data storage drives; and
- library control configured to:
- detect the occurrence of selected error events involving data storage drives;
- categorize said error events into:
  1) error events before and during a mount of a data storage media into a data storage drive; and
  2) error events after a successful mount of a data storage media into a data storage drive;
- separately track successive error events of individual data storage drives in each of said categories, wherein a complete successful operation of said data storage drive breaks the chain of said successive error events;
- compare the number of said successive error events of a data storage drive in a category to a threshold; and
- upon said number of said successive error events reaching said threshold, place said data storage drive in a failed category; and
- wherein said library control is additionally configured to:
- detect the occurrence of selected error events involving data storage media;
- categorize said error events involving said data storage media into:
  1) error events before and during a mount of a data storage media into a data storage drive; and
  2) error events after a successful mount of a data storage media into a data storage drive;
- separately track successive error events of individual data storage media in each of said categories, wherein a complete successful operation of said data storage media with respect to a data storage drive breaks the chain of said successive error events;
- compare the number of said successive error events of a data storage media in a category to a threshold; and
- upon said number of said successive error events reaching said threshold, place said data storage media in a failed category; and, wherein said library control is additionally configured to:
- if a data storage media is removed from said subsystem, clear said error events of data storage drive that occurred at said data storage drive with respect to said removed data storage media.

22. The automated data storage library subsystem of claim 21, wherein said library control is additionally configured to:
- if a data storage media is removed from said subsystem, clear said error events of said removed and returned data storage media.

23. An automated data storage library subsystem comprising:
- storage shelves configured to store data storage media;
- a plurality of data storage drives configured to mount, demount, read and write data with respect to data storage media;
- at least one robot accessor configured to transfer data storage media between said storage shelves and said data storage drives; and
- library control configured to:
- detect the occurrence of selected error events involving a data storage media and error events involving a data storage drive;
- upon a selected error event involving a data storage media, attempt to move said data storage media to another data storage drive to prevent a retry procedure, and conduct a similar operation to the operation that resulted in said selected error event;
- separately track successive error events of individual data storage drives, wherein a complete successful operation of at least one of said data storage drives breaks the chain of said successive error events for said successful at least one data storage drive and said data storage media having a chain of successive error events;

compare the number of said successive error events of a data storage drive to a threshold;

upon said number of said successive error events reaching said threshold, place said data storage drive in a failed category;

separately track successive error events of individual data storage media, wherein a complete successful operation of said data storage media breaks the chain of said successive error events;

compare the number of said successive error events of a data storage media to a threshold; and upon said number of said successive error events reaching said threshold, place said data storage media in a failed category.

24. A computer program product comprising at least one of data storage and memory having computer useable program code stored therein for operating a library control of an automated data storage library subsystem, said subsystem comprising storage shelves configured to store data storage media, a plurality of data storage drives configured to mount, demount, read and write data with respect to data storage media, at least one robot accessor configured to transfer data storage media between said storage shelves and said data storage drives; said computer useable program code configured to, when executed on said library control, cause said library control to:

detect the occurrence of selected error events involving data storage drives;

categorize said error events into:

1) error events before and during a mount of a data storage media into a data storage drive; and 2) error events after a successful mount of a data storage media into a data storage drive;

separately track successive error events of individual data storage drives in each of said categories, wherein a complete successful operation of said data storage drive breaks the chain of said successive error events, wherein said breaking of said chain of successive error events applies only to a category of error events to which said complete successful operation belongs;

compare the number of said successive error events of a data storage drive in a category to a threshold; and upon said number of said successive error events reaching said threshold, place said data storage drive in a failed category.

25. The computer program product of claim 24, wherein said computer useable program code is additionally configured to, when executed on said library control, cause said library control to:

detect the occurrence of selected error events involving data storage media;

categorize said error events involving said data storage media into:

1) error events before and during a mount of a data storage media into a data storage drive; and 2) error events after a successful mount of a data storage media into a data storage drive;

track successive error events of individual data storage media in each of said categories, wherein a complete successful operation of said data storage media with respect to a data storage drive breaks the chain of said successive error events, wherein said breaking of said chain of successive error events applies only to a category of error events to which said complete successful operation belongs;

compare the number of said successive error events of a data storage media in a category to a threshold; and upon said number of said successive error events reaching said threshold, place said data storage media in a failed category.

26. The computer program product of claim 25, wherein said computer useable program code is additionally configured to, when executed on said library control, cause said library control to:

reduce related errors to a single said selected error event.

27. The computer program product of claim 25, wherein said computer useable program code is additionally configured to, when executed on said library control, cause said library control to:

store, in a database, information relating to said selected error events relevant to both a data storage media and a data storage drive, said information describing said data storage media and said data storage drive and said selected error event.

28. A computer program product comprising at least one of data storage and memory having computer useable program code stored therein for operating a library control of an automated data storage library subsystem, said subsystem comprising storage shelves configured to store data storage media, a plurality of data storage drives configured to mount, demount, read and write data with respect to data storage media, at least one robot accessor configured to transfer data storage media between said storage shelves and said data storage drives; said computer useable program code configured to, when executed on said library control, cause said library control to:

detect the occurrence of selected error events involving data storage drives; categorize said error events into:

1) error events before and during a mount of a data storage media into a data storage drive; and 2) error events after a successful mount of a data storage media into a data storage drive;

separately track successive error events of individual data storage drives in each of said categories, wherein a complete successful operation of said data storage drive breaks the chain of said successive error events;

compare the number of said successive error events of a data storage drive in a category to a threshold; and upon said number of said successive error events reaching said threshold, place said data storage drive in a failed category; and, additionally to:

detect the occurrence of selected error events involving data storage media;

categorize said error events involving said data storage media into:

1) error events before and during a mount of a data storage media into a data storage drive; and 2) error events after a successful mount of a data storage media into a data storage drive;

track successive error events of individual data storage media in each of said categories, wherein a complete successful operation of said data storage media with respect to a data storage drive breaks the chain of said successive error events;

compare the number of said successive error events of a data storage media in a category to a threshold; and upon said number of said successive error events reaching said threshold, place said data storage media in a failed category; and additionally to:

categorize said error events into:

A) immediate error events; and

B) non-immediate error events; and upon isolating at least one of a data storage media and a data storage drive with said immediate error event, place said isolated at least one of said data storage media and said data storage drive in a failed category; and conduct said tracking, comparing and placing steps for said non-immediate error events for said at least one of said data storage drive and said data storage media involved in said immediate error event with said at least one of said failed category data storage media and said failed category data storage drive without considering said immediate error event in said succession and said accumulation of error events.

29. A computer program product comprising at least one of data storage and memory having computer useable program code stored therein for operating a library control of an automated data storage library subsystem, said subsystem comprising storage shelves configured to store data storage media, a plurality of data storage drives configured to mount, demount, read and write data with respect to data storage media, at least one robot accessor configured to transfer data storage media between said storage shelves and said data storage drives; said computer useable program code configured to, when executed on said library control, cause said library control to:

detect the occurrence of selected error events involving data storage drives;

categorize said error events into:

1) error events before and during a mount of a data storage media into a data storage drive; and 2) error events after a successful mount of a data storage media into a data storage drive;

separately track successive error events of individual data storage drives in each of said categories, wherein a complete successful operation of said data storage drive breaks the chain of said successive error events;

compare the number of said successive error events of a data storage drive in a category to a threshold; and upon said number of said successive error events reaching said threshold, place said data storage drive in a failed category; and, additionally to:

detect the occurrence of selected error events involving data storage media;

categorize said error events involving said data storage media into:

1) error events before and during a mount of a data storage media into a data storage drive; and 2) error events after a successful mount of a data storage media into a data storage drive;

track successive error events of individual data storage media in each of said categories, wherein a complete successful operation of said data storage media with respect to a data storage drive breaks the chain of said successive error events;

compare the number of said successive error events of a data storage media in a category to a threshold; and upon said number of said successive error events reaching said threshold, place said data storage media in a failed category; and, wherein said computer useable program additionally to:

separately accumulate selected error events in said categories regarding individual data storage drives and regarding individual data storage media over a period of time;

compare the number of said accumulated error events of at least one of a data storage drive and a data storage media to a threshold; and upon said number of said accumulated error events reaching said threshold, place said at least one of said data storage drive and said data storage media in a failed category.

30. The computer program product of claim 29, wherein said computer useable program code is additionally configured to, when executed on said library control, cause said library control to:

if error events are related to each other, reduce weighting of said error events in said succession and in said accumulation of said selected error events.

31. A computer program product comprising at least one of data storage and memory having computer useable program code stored therein for operating a library control of an automated data storage library subsystem, said subsystem comprising storage shelves configured to store data storage media, a plurality of data storage drives configured to mount, demount, read and write data with respect to data storage media, at least one robot accessor configured to transfer data storage media between said storage shelves and said data storage drives;

said computer useable program code configured to, when executed on said library control, cause said library control to:

detect the occurrence of selected error events involving data storage drives;

categorize said error events into:

1) error events before and during a mount of a data storage media into a data storage drive; and 2) error events after a successful mount of a data storage media into a data storage drive;

separately track successive error events of individual data storage drives in each of said categories, wherein a complete successful operation of said data storage drive breaks the chain of said successive error events;

compare the number of said successive error events of a data storage drive in a category to a threshold; and upon said number of said successive error events reaching said threshold, place said data storage drive in a failed category; and, additionally to:

detect the occurrence of selected error events involving data storage media;

categorize said error events involving said data storage media into:

1) error events before and during a mount of a data storage media into a data storage drive; and 2) error events after a successful mount of a data storage media into a data storage drive;

track successive error events of individual data storage media in each of said categories, wherein a complete successful operation of said data storage media with respect to a data storage drive breaks the chain of said successive error events;

compare the number of said successive error events of a data storage media in a category to a threshold; and upon said number of said successive error events reaching said threshold, place said data storage media in a failed category; and, additionally to:

if a data storage drive is removed from said subsystem, clear said error events of data storage media that occurred at said removed data storage drive.

32. The computer program product of claim 31, wherein said computer useable program code is additionally configured to, when executed on said library control, cause said library control to:
   if a data storage drive is removed from said subsystem and returned, clear said error events of said removed and returned data storage drive.

33. A computer program product comprising at least one of data storage and memory having computer useable program code stored therein for operating a library control of an automated data storage library subsystem, said subsystem comprising storage shelves configured to store data storage media, a plurality of data storage drives configured to mount, demount, read and write data with respect to data storage media, at least one robot accessor configured to transfer data storage media between said storage shelves and said data storage drives;
   said computer useable program code configured to, when executed on said library control, cause said library control to:
   detect the occurrence of selected error events involving data storage drives;
   categorize said error events into:
   1) error events before and during a mount of a data storage media into a data storage drive; and
   2) error events after a successful mount of a data storage media into a data storage drive;
   separately track successive error events of individual data storage drives in each of said categories, wherein a complete successful operation of said data storage drive breaks the chain of said successive error events;
   compare the number of said successive error events of a data storage drive in a category to a threshold; and
   upon said number of said successive error events reaching said threshold, place said data storage drive in a failed category; and, additionally to:
   detect the occurrence of selected error events involving data storage media;
   categorize said error events involving said data storage media into:
   1) error events before and during a mount of a data storage media into a data storage drive; and
   2) error events after a successful mount of a data storage media into a data storage drive;
   track successive error events of individual data storage media in each of said categories, wherein a complete successful operation of said data storage media with respect to a data storage drive breaks the chain of said successive error events;
   compare the number of said successive error events of a data storage media in a category to a threshold; and
   upon said number of said successive error events reaching said threshold, place said data storage media in a failed category; and, additionally to:
   if a data storage media is removed from said subsystem, clear said error events of data storage drive that occurred at said data storage drive with respect to said removed data storage media.

34. The computer program product of claim 33, wherein said computer useable program code is additionally configured to, when executed on said library control, cause said library control to:
   if a data storage media is removed from said subsystem, clear said error events of said removed and returned data storage media.

35. A computer program product comprising at least one of data storage and memory having computer useable program code stored therein for operating a library control of an automated data storage library subsystem, said subsystem comprising storage shelves configured to store data storage media, a plurality of data storage drives configured to mount, demount, read and write data with respect to data storage media, at least one robot accessor configured to transfer data storage media between said storage shelves and said data storage drives; and said library control, said computer useable program code configured to, when executed on said library control, cause said library control to:
   detect the occurrence of selected error events involving a data storage media and selected error events involving a data storage drive;
   upon a selected error event involving a data storage media, attempt to move said data storage media to another data storage drive to prevent a retry procedure, and conduct a similar operation to the operation that resulted in said selected error event;
   separately track successive error events of individual data storage drives, wherein a complete successful operation of at least one of said data storage drives breaks the chain of said successive error events for said successful at least one data storage drive having a chain of said successive error events;
   compare the number of said successive error events of a data storage drive to a threshold; and
   upon said number of said successive error events reaching said threshold, place said data storage drive in a failed category;
   separately track successive error events of individual data storage media, wherein a complete successful operation of said data storage media breaks the chain of said successive error events;
   compare the number of said successive error events of a data storage media to a threshold; and
   upon said number of said successive error events reaching said threshold, place said data storage media in a failed category.

* * * * *